(12) United States Patent
Abbott

(10) Patent No.: US 8,890,038 B2
(45) Date of Patent: *Nov. 18, 2014

(54) HEATING APPARATUS WITH MULTIPLE ELEMENT ARRAY

(75) Inventor: Richard C. Abbott, Boucherville (CA)

(73) Assignee: Thermoceramix Inc., Boucherville (CA)

( * ) Notice: Subject to any disclaimer, the term of this patent is extended or adjusted under 35 U.S.C. 154(b) by 593 days.

This patent is subject to a terminal disclaimer.

(21) Appl. No.: 13/078,498

(22) Filed: Apr. 1, 2011

(65) Prior Publication Data

US 2012/0074127 A1 Mar. 29, 2012

Related U.S. Application Data

(63) Continuation-in-part of application No. 12/359,878, filed on Jan. 26, 2009, now Pat. No. 7,919,730, which is a continuation of application No. 11/093,524, filed on Mar. 30, 2005, now Pat. No. 7,482,556.

(60) Provisional application No. 60/557,539, filed on Mar. 30, 2004.

(51) Int. Cl.
*H05B 3/68* (2006.01)
*H05B 3/16* (2006.01)
*H05B 6/12* (2006.01)

(52) U.S. Cl.
CPC .......... *H05B 6/1272* (2013.01); *H05B 2213/03* (2013.01)

USPC ........................................ 219/466.1; 219/543

(58) Field of Classification Search
USPC .................. 219/443.1–448.13, 460.1, 462.1, 219/465.1–467.1, 542–548; 338/307–309
See application file for complete search history.

(56) References Cited

U.S. PATENT DOCUMENTS

| | | |
|---|---|---|
| 3,953,711 A | 4/1976 | Eck et al. |
| 4,983,810 A | 1/1991 | Balderson |
| 5,504,307 A | 4/1996 | Hayashi et al. |
| 5,508,495 A | 4/1996 | Yahav et al. |
| 5,665,262 A | 9/1997 | Hajaligol et al. |
| 6,037,572 A | 3/2000 | Coates et al. |
| 6,140,617 A | 10/2000 | Berkcan et al. |
| 6,155,711 A | 12/2000 | Schaupert et al. |
| 6,225,608 B1 | 5/2001 | Kallgren |
| 6,236,025 B1 | 5/2001 | Berkcan et al. |
| 6,462,316 B1 | 10/2002 | Berkcan et al. |
| 6,492,627 B1 | 12/2002 | Ensinger et al. |
| 6,501,053 B2 | 12/2002 | Becker et al. |
| 6,501,054 B2 | 12/2002 | Engelmann et al. |
| 6,870,138 B2 | 3/2005 | Pastore |
| 7,482,556 B2 | 1/2009 | Shaw et al. |

*Primary Examiner* — Sang Y Paik
(74) *Attorney, Agent, or Firm* — BCF LLP

(57) ABSTRACT

A heating apparatus assembly and method are provided for heating a surface. The heating apparatus contains a substrate with a multiplicity of heating elements disposed upon at least one surface of the substrate where each element is individually controllable.

22 Claims, 3 Drawing Sheets

HEATING APPARATUS WITH MULTIPLE ELEMENT ARRAY

CROSS-REFERENCE TO RELATED APPLICATIONS

This application is a continuation-in-part of U.S. patent application Ser. No. 12/359,878, filed Jan. 26, 2009, entitled "Heating Apparatus With Multiple Element Array", now U.S. Pat. No. 7,919,730. Through the '878 application, this application is a continuation of U.S. patent application Ser. No. 11/093,524, filed Mar. 30, 2005, entitled "Heating Apparatus With Multiple Element Array", now U.S. Pat. No. 7,482,556. Through the '524 application, this application claims the benefit of priority to U.S. provisional patent application Ser. No. 60/557,539, filed Mar. 30, 2004, entitled "Heating Apparatus With Multiple Element Array". The entirely of all of these applications is incorporated herein by reference.

FIELD OF THE INVENTION

The present invention is related to heating, and more particularly to a method and apparatus for heating a surface using multiple, independently controlled heating elements disposed over that surface.

BACKGROUND OF THE INVENTION

Surfaces are heated either to achieve a uniform temperature distribution, such as for heated rolls in paper making, or to achieve areas of high and low temperature, such as for the surface of a cooktop.

For achieving uniform temperatures throughout a region of the surface, steam, or another hot fluid, is often circulated through channels cut under the surface. Alternatively, electrical resistance heaters may be inserted below the surface of a structure, where the structure is required to be designed for high thermal conductivity. In yet other designs, radiant heaters are configured to illuminate the heating surface uniformly from above or below. Often, the heated surfaces are supported by massive substrates for storing heat. The result is often a surface that exhibits some degree of temperature uniformity but with poor or slow temperature control, especially when there are variable thermal loads, rapid heating or cooling process conditions, or geometric discontinuities in the heated region of the surface, such as corners and edges.

In the example of a cooktop, where areas of high temperature are needed with adjacent areas of law temperature, large, discrete gas burners or electrical resistance elements are distributed over the surface to provide specific locations where independent temperature control is available for heating generally a small number of cooking utensils. In other systems, electric or gas heating elements are embedded in or under cooking surfaces that conduct heat laterally to a greater or lesser extent. The limitations of these systems typically are the small number of fixed locations on the surface where high temperatures are achievable, the fixed size of areas that can be heated, poor thermal efficiency, and no provision for indicating that an area of the surface is still hot after power is cut.

A second example of a heated surface with variable temperatures is a thermal print head. Here, an array of up to six-hundred (600) minute resistors dispense a tiny quantity of energy into an ink channel to form a bubble that creates a jet of fluid. Each resistor is addressable and is controlled independently from the others. A limitation of the thermal print head is size and power.

There is a clear need, therefore, for a more active surface for temperature control, whereby the surface can achieve accurate, uniform temperatures when desired, regardless of location on the surface, part geometry, process heating conditions, or thermal load. In addition, there is a clear need for surfaces that can respond to multiple demands for high, differing temperatures at arbitrary areas without unduly heating adjacent areas, while providing a visual indication of temperature for each arbitrary area.

SUMMARY OF THE INVENTION

The present invention provides a system and method for heating a surface. Briefly described, in architecture, one embodiment of the system, among others, can be implemented as follows. A heating apparatus assembly for heating a surface contains a substrate with a multiplicity of heating elements disposed upon at least one surface of the substrate where each element is individually controllable.

The present invention can also be viewed as providing methods for heating an apparatus. In this regard, one embodiment of such a method, among others, can be broadly summarized by the following steps: providing a surface; providing a resistive heater array on at least one surface; providing a system of interconnections between the individual heaters and a controller and power source; providing a means of sensing temperatures associated with individual heater elements of said array; and providing a controller and power source.

The following summarizes other aspects of the invention.

The apparatus of this invention contains a heating surface with a multiplicity of small heating elements disposed over it. In addition, the apparatus contains a controller that can control each heating element independent of the others and sense a temperature associated with each heating element. The heating surface is preferably an engineering material such as a metal or ceramic with the requisite mechanical and thermal properties suited for the application.

Other systems, methods, features, and advantages of the present invention will be or will become apparent to one with skill in the art upon examination of the following drawings and detailed description. It is intended that ail such additional systems, methods, features, and advantages be included within this description, be within the scope of the present invention, and be protected by the accompanying claims.

DETAILED DESCRIPTION

Figure 1A:
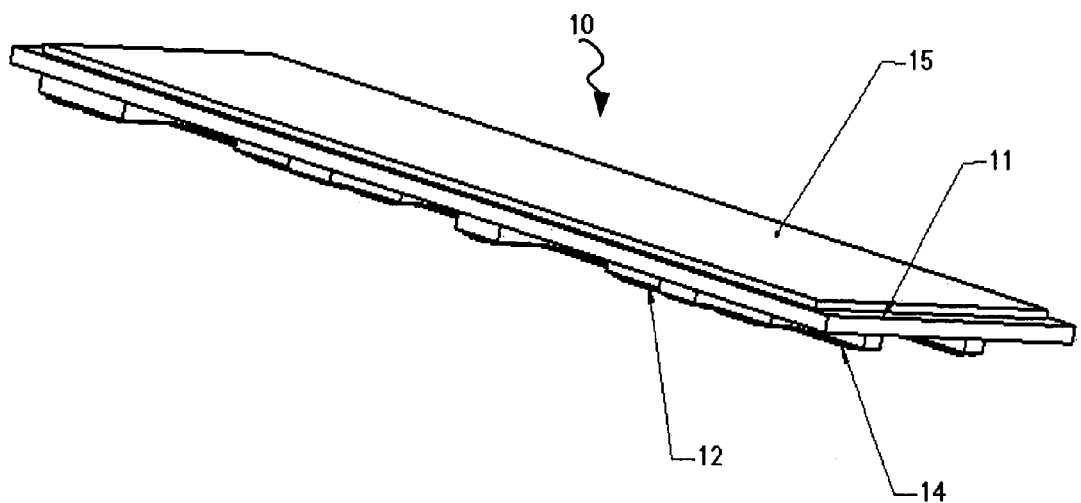
FIG. 1A is a cross-sectional side view of a multiple element heater array assembly having elements located at a bottom of the assembly.
Figure 1B:
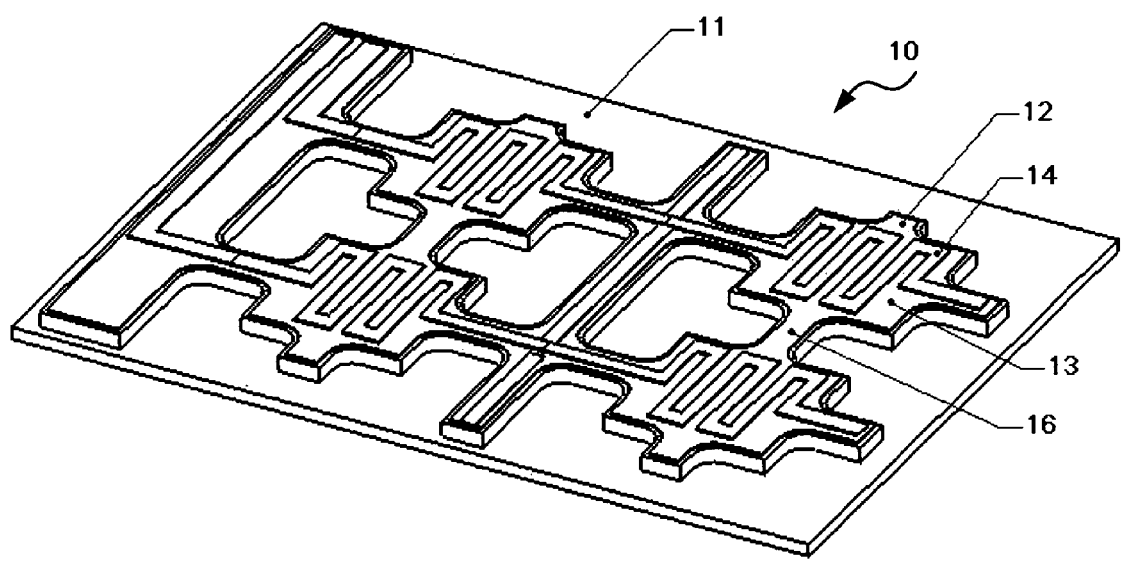
FIG. 1B is a bottom perspective view of the multiple element heater array assembly of FIG. 1A.
Figure 2:
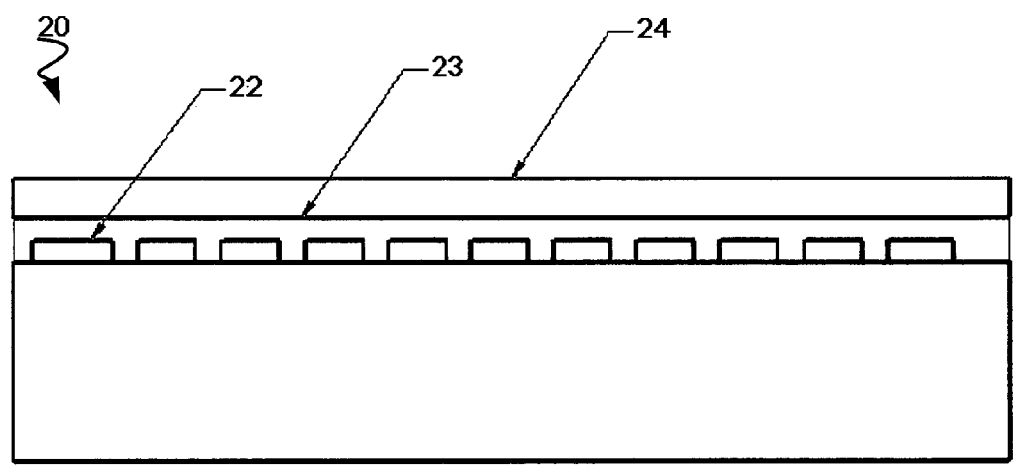
FIG. 2 is a cross-sectional side view of a multiple element heater array having elements located at the top of the array.

Those skilled in the art will gain an appreciation of the invention from a reading of the following description of the preferred embodiments of the invention, in conjunction with a viewing of the accompanying drawings of FIGS. 1-2, inclusive.

Referring to FIG. 1A and FIG. 1B, a fragmentary, cross-sectional side and bottom view respectively of an embodiment of the apparatus of the invention, there will be seen a multiple heating element array assembly 10 of the invention.

The assembly comprises a surface and substrate 11 that supports the heating element array 14 below and a top layer 15 above. It should be noted that the top layer 15 is also referred to herein as a heating surface. The thickness is such that the surface and substrate offers sufficient strength for supporting what it is designed for, e.g. cooking pots full of water, but thin enough so that heat is not conducted appreciably in a lateral direction. Moreover, the surface and substrate should have good thermal shock resistance to allow the heating apparatus to be heated rapidly or to be heated in such a way that high lateral thermal gradients may be supported without distortion.

The surface and substrate 11 is preferably composed of stainless steel, cast iron, carbon steel, copper, aluminum, ceramic or other material which has sufficient mechanical strength and corrosion resistance to function at the desired operating temperature. It also has an appropriate coefficient of thermal expansion to be compatible with the coatings that are deposited on it such that large thermoelastic stresses are not engendered during heating. Attached to the underside of surface and substrate 11 is an array of blocks 12 that serve to support the heating element array 14.

The blocks 12 are arranged in a symmetric array coincident with the heating element array 14 that is to be applied on top of them. They are preferably composed of the same material as the surface and substrate 11 and are either attached to the surface and substrate 11 by means of mechanical fasteners, welding, brazing, or adhesives, or are formed as integral members of the surface and substrate 11 by machining, casting, or powder metallurgical processes. The blocks 12 may be of a different material from the surface and substrate 11 but chosen such that heat is readily conducted from the heating element array 14 located on them to the surface and substrate 11 and such that they offer sufficient mechanical rigidity to the structure to counteract thermal stresses which will occur when some heating element of the heating element array 14 are energized and heat while other elements are not energized and remain cool. That is to say, the blocks 12 should have high thermal conductivity, high thermal shock resistance, and a high modulus of elasticity.

The blocks 12 are interlocked with a web 16 of similar material, as shown, to form a rigid structure which, being attached to the surface and substrate 11, is designed to prevent distortion of the surface and substrate 11 when it is heated. The web 16 also serves as a path for interconnections between the discrete heating elements of the heating element array 14 located on the blocks 12. The surface of the blocks 12 and interconnecting web 16 is coated with a dielectric material 13, that serves to electrically insulate the heating element array 14 and their interconnects from the blocks 12 and interconnecting web 16. This is only necessary if the blocks 12 and interconnecting web 16 is an electrical conductor. As an example, the dielectric material 13 may have a dielectric strength of 3750 volts at a maximum of 0.250 milliamps leakage current. It is preferred, however, that the dielectric material have low thermal conductivity and a coefficient of thermal expansion compatible with the blocks 12 and interconnecting web 16.

The dielectric material may be in the form of an applied coating, a thin film, a glassy layer, cement, porcelain, or an insulating sheet of material. The insulator 13 would preferably have a good thermal coupling to the blocks 12 even if it is not integrally attached such as, for example, a sheet of material disposed below the blocks 12 with a thermally conductive gasket material between the sheets and the blocks 12. The dielectric material 13 may be composed of, for example, aluminum oxide, mica, silicon oxide, porcelain, magnesium oxide. The heating element array 14 is located on top of the dielectric material 13 and typically coincident with the blocks 12 and interconnecting web 16, with each black supporting one heating element.

The heating elements of the heating element array 14 are preferably coatings of resistive material that may be deposited by thermal spray, sputtering, evaporation, chemical vapor deposition, or by thick film techniques such as screen-printing or automated dispensing. Examples of these materials are conductive ceramics such as zirconium boride, silicon carbide or tin oxide, conductive glasses or resistive metals such as titanium, platinum, nickel, or iron alloys. Alternatively, electrodeposited materials, resistive foils, or laminates that are subsequently delineated by etching, electron beam, laser, machining or another form of material removal, may be used to deposit the heating elements. The heating element array 14 is comprised of heating elements and their interconnections, which may be either of the same material or different materials. For example, the individual heating elements could be composed of a nickel or iron alloy while the interconnecting wires could be composed of copper, silver or pure nickel.

On top of the surface and substrate 11 is a top surface/coating 15, that is also deposited by conventional coating processes. Its purpose is to provide physical properties desirable for the application but not offered by the surface and substrate 11. Accordingly, coatings which provide a harder, scratch resistant, corrosion resistant, more durable cooking surface or a nonstick surface would be applied. Alternatively, thermochromic or decorative layers might be applied. Such layers may be composed of chromium carbide, tungsten carbide, titanium carbide, inconel, stainless steel, porcelain, ceramic, glass ceramic, or colored aluminum oxide. The thermochromic additive may be comprised of, for example, various selenium compounds.

Further with regard to the heating elements, the heating elements may be disposed over the surface and substrate 11 either between a thermal load and the surface and substrate 11 or on the opposite side of the surface and substrate 11 to the thermal load. The heating elements may be arranged in an array of similarly sized units, however they could also vary in size, spacing, geometry, and electrical properties. The size of the heating elements is preferably small enough to provide the desired temperature and spatial resolution across the surface and substrate 11. Similarly, the arrangement of the heating elements is preferably such that heat is provided to the surface and substrate 11 in the most thermally efficient way. For example, in a cooktop, the heating elements are preferably small enough to define an area under a cooking utensil without supplying heat to areas with no cooking utensil above them. In addition, the heating elements may be arranged such that they are located immediately under the likely location of the cooking utensils. Thus, if it is desired to heat cooking utensils anywhere over a heated surface, the heating element array would be distributed over the entire area.

As stated above, the heating elements are preferably deposited electrically resistive coatings with intimate thermal contact to the surface and substrate 11 of the heating surface for maximum heat transfer, rapid response and minimum losses. The electrically resistive coatings may be deposited by means of thermal spray, chemical vapor deposition, evaporation, sputtering, electroplating, or thick film techniques such as screen-printing and automated dispensing. The heating element patterns may be achieved through conventional semiconductor processing techniques such as photolithography, screen printing, or cut masks. Alternatively, the electrically resistive coatings may be deposited and subsequently cut using material removal methods such as laser, ion beam, electron beam or mechanical cutting, water jet, liquid nitrogen jet, micro abrasion, or chemical etching. Heating elements other than electrically resistive coatings may also be used, such as foils, free-standing elements, attached wires, and radiant heaters.

If the substrate of the surface is an electrical conductor, it may be necessary to interpose an electrically insulating layer between the heating elements and the substrate. Such electrically insulating layers may be composed of aluminum oxide, mica, porcelain or other electrical insulator, preferably with a thermal expansion coefficient compatible with the surface substrate and resistive heating element. The electrically insulating layers may be mechanically attached, deposited by the same techniques as the electrically resistive layer, or by cements, paints or adhesives. Moreover, if the heating elements are located between the heating surface and the thermal load, it may be necessary to apply one or more additional layers on the heating elements to isolate them electrically or thermally, or to impart more impact resistance from the thermal load. In some cases, a layer may be added to provide a thermochromic response to heating conditions, a non-stick property, a modification of the thermal emissivity, or a decorative effect.

In another embodiment, the resistive heating element is replaced by an induction-heating element that is created by spraying a layer of conductive material such as copper onto a substrate. A laser or other cutting device is used to cut an array of coils in the sprayed layer. When the coil is energized, a magnetic field is induced.

To increase the strength of the magnetic field and thus the power of the heating element, two or more arrays of coils can be stacked. The conductive material is sprayed on the substrate, then the coils are cut, a ceramic layer is overlaid or sprayed on the conductive material to provide insulation. Several layers of conductive material and insulation can be stacked to provide the require strength. The layers may be connected together by cutting a hole through the different surfaces such that stacked coils use the same flow of current.

Alternatively, the conductive material can be sprayed on an insulating material such as mica and the insulated sheets can be stacked and connected as described above. The induction-heating element can be located under a glass or glass ceramic top to create an induction cooktop.

In one embodiment, associated with each heating element is a temperature sensor that is connected to the controller for controlling the power delivered to that element. The temperature sensor may be the heating element itself or it may be a separate temperature sensor such as a thermocouple, RTD or infrared detector that is in close proximity to the heating surface region for which the heating element is intended to provide temperature control. The temperature sensor may be a deposited layer adjacent to the heating element or a discrete device. Also associated with each heating element and temperature sensor are at least two electrical terminals and interconnections. The interconnections are preferably deposited layers but may also be wires, pins, or mechanical contacts attached using conventional electronic techniques such as micro welding, ball bonding, cementing, soldering, and brazing.

The controller and power supply are preferably connected to each heating element of the array and each temperature sensor associated with each heating element of the array. As such, the controller and power supply provide energy to individual heating elements commensurate to the difference between the set point temperature, set by the user, and the temperature present at that point in time, as interpreted from the temperature sensor. In addition, the controller will have stored in memory the requisite data for interpreting temperature sensor information as temperatures and the necessary algorithms for accurate control of the surface temperature. In one configuration, the controller is capable of sensing the existence and location of a thermal load and its magnitude for individual elements by interpreting the rate of temperature rise registered by a temperature sensor in response to a known supplied energy input. For example, in the case of a cooktop with a multiple heating element array, when the controller supplies a pulse of electrical energy to each heating element of an array, then measures the temperature response to each heating element's output, it determines from the time response of temperature if a cooking utensil is above the element and the value of its present surface temperature. It therefore has acquired information on where the cooking utensils are located on the surface and what their current temperature is. In addition, the preferred controller has the capability to hold any heating element at a set maximum temperature and to a set maximum current or voltage. As such, it can apportion power to groups of heating elements where desired. Again, in the example of a cooktop, the controller can direct a large amount of power to a small group of heating elements, for example under a large cooking utensil that requires a large amount of power, while directing lower amounts to other cooking utensils. The temperature, current and voltage control allows this to happen, even though the entire heating element array over the surface could not be powered with that level at one time due to the limited total power available to the heating apparatus.

The heating apparatus and control system as described will heat a surface either uniformly or to differing temperatures at arbitrarily designated locations with a number of advantages over the prior art. The multiple heating element array provides for selective application of thermal energy only where it is needed. The heating elements allow a high degree of thermal efficiency and fast response by nature of their intimate bond to the surface and close proximity to the load. The addition of suitable electronic controls provides for thermal load sensing, thermal load follower PID control, variable power density to selected areas of the surface, over-temperature, current limit, and voltage level control. The ability to apply different layers to the heating surface adds great flexibility to the heating apparatus for achieving various properties such as safety, cleanability, durability, and appearance.

Referring to FIG. 2, a cross-sectional side view of a multiple element heater array assembly 20 having elements located at the top of the array assembly 20 is illustrated. The purpose of this assembly 20 is to provide a uniform temperature over the surface with highly efficient thermal coupling with the load, which rests on top of the surface. Consequently, the assembly 20 provides for high thermal conduction over the surface and close proximity of the heater array to the load. The assembly comprises a surface and substrate 21 that has the purpose of imparting mechanical strength to the entire assembly as well as supporting the deposited layers that comprise the heater array. It is preferably composed of a common engineering material such as steel, stainless steel, aluminum, cast iron or a structural ceramic such as silicon carbide, silicon nitride, cordierite, or aluminum oxide. Since the purpose of the heating apparatus is to achieve highly uniform temperatures over its surface, the surface and substrate 21 preferably will have a high thermal conductivity. Similarly, the dimensions of the surface and substrate 21 will be chosen to provide for high lateral thermal conduction. The heating element array 22 is preferably deposited as a layer on top of the surface using the same techniques and materials as described above. Similarly, the interconnections between individual elements of the heating element array 22 are deposited as described above. Above the heating element array 22 and interconnection array is deposited a dielectric layer 23 which electrically insulates the heating element array 22 from the load. It may be deposited as described above or it may consist of an electrically insulating cement or polymer. Its principle purpose is to electrically isolate the heating element array 22 from the thermal load or a possible topmost layer 24. The topmost layer 24 may be applied to effect some additional engineering property such as dimensional tolerance, hardness, impact resistance, appearance, safety or corrosion resistance.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

The invention claimed is:

1. A heating apparatus assembly for heating a surface, said assembly comprising a substrate with a multiplicity of heating elements arranged in an array of heating elements disposed upon a first surface of the substrate, the heating elements comprising a sprayed material, the first surface of the substrate comprising an array of blocks, the heating elements being disposed on the blocks, each element being individually and independently controllable separate from other elements within the multiplicity of heating elements, wherein a voltage provided to each element, independent of a voltage provided to other elements is controllable, and wherein a temperature of each element is individually controllable independent of a temperature of other elements.

2. The assembly of claim 1 wherein the sprayed material is a conductive material and the heating element is an induction heating element.

3. The assembly of claim 2 wherein the heating elements are coils.

4. The assembly of claim 2 wherein the heating elements are copper.

5. The assembly of claim 2 wherein the heating elements comprise an array of stacked coils, coils of a stack being separated by an insulating layer.

6. The assembly of claim 5 wherein the coils are each connected to a power source via a network of connectors and share a same flow of current.

7. The assembly of claim 2 wherein the heating elements are sprayed on an insulating material.

8. The assembly of claim 2 wherein a temperature sensor is associated with each heating element of the multiplicity of heating elements.

9. The assembly of claim 2 wherein the substrate is a glass ceramic.

10. The assembly of claim 2 wherein the surface is a cooking surface.

11. The assembly of claim 2 wherein the multiplicity of heating elements is connected to a controller that controls each element independently.

12. The assembly of claim 11 wherein the controller is capable of sensing the existence of a load and its temperature.

13. The assembly of claim 11 wherein the controller is capable of limiting the temperature, current and voltage of the elements by controlling voltage provided to individual elements.

14. A method of making a heating apparatus comprising:
(a) providing an array of blocks on a substrate;
(b) providing a heater array coincident with the array of blocks, wherein the heater array comprises a multiplicity of heating elements deposited by spray;
(c) providing a controller and a power source;
(d) providing a system of interconnections between the individual heating elements and the controller and the power source; and
(e) individually sensing temperatures associated with each individual heating element of said array.

15. The method of claim 14 wherein the heating elements are induction heating elements.

16. The method of claim 15 wherein the heating elements are deposited by the spray of a conductive material.

17. The method of claim 15 wherein the heating elements are deposited as layers by the spray of a conductive material.

18. The method of claim 17 wherein interconnections between the heating elements and the power source are deposited as layers.

19. The method of claim 15 wherein the heater array comprises a multiplicity of heating elements deposited by spray on an insulation layer to form a heating element/insulation layer assembly, further comprising:
stacking at least two heating element/insulation layer assemblies on top of one another;
interconnecting the stacked heating element/insulation layer assemblies such that they share a same current flow from the power source.

20. The method of claim 15 wherein the heating elements are usable to sense their respective temperatures.

21. The method of claim 15 wherein the controller is capable of controlling each heating element individually.

22. The method of claim 15 wherein the controller is capable of sensing a thermal load location on the substrate.

* * * * *